(12) United States Patent
Ito et al.

(10) Patent No.: US 6,679,944 B1
(45) Date of Patent: Jan. 20, 2004

(54) LEAKAGE WATER CUT-OFF AGENT AND METHOD OF PREVENTING WATER LEAKAGE

(75) Inventors: Yuji Ito, Gumma (JP); Akemi Shiraishi, Gumma (JP); Wakako Tamura, Gumma (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 163 days.

(21) Appl. No.: 10/048,320

(22) PCT Filed: Aug. 2, 2000

(86) PCT No.: PCT/JP00/05179

§ 371 (c)(1), (2), (4) Date: Jan. 29, 2002

(87) PCT Pub. No.: WO01/10973

PCT Pub. Date: Feb. 15, 2001

(30) Foreign Application Priority Data

Aug. 3, 1999 (JP) ............................................. 11-220282

(51) Int. Cl.[7] ............................. C09K 3/12; C09K 3/10; E04B 1/68

(52) U.S. Cl. ................. 106/287.17; 106/33; 106/286.5; 106/639; 106/661; 106/665; 106/666; 106/692

(58) Field of Search ................................. 106/33, 286.5, 106/287.17, 639, 661, 665, 666, 692

(56) References Cited

U.S. PATENT DOCUMENTS 6,136,867 A * 10/2000 Frouin et al. .................. 516/80

FOREIGN PATENT DOCUMENTS

| JP | 11-139856 | 5/1999 |
|---|---|---|
| JP | 11-190133 | 7/1999 |
| JP | 11-200520 | 7/1999 |

* cited by examiner

Primary Examiner—David Brunsman
(74) Attorney, Agent, or Firm—Nields & Lemack

(57) ABSTRACT

An object of the present invention is to provide a leakage water cut-off agent that has an excellent power to seal a water leakage site by a simple process without damaging the appearance of a building. A leakage water cut-off agent of the present invention comprises (a) a surfactant, (b) an aluminium compound and (c) a basic substance, and further comprises water if necessary.

7 Claims, 1 Drawing Sheet

LEAKAGE WATER CUT-OFF AGENT AND METHOD OF PREVENTING WATER LEAKAGE

This application is a 371 of PCT/JP00/05179 filed Aug. 2, 2000.

TECHNICAL FIELD

The present invention relates to a leakage water cut-off agent that has an excellent capability for preventing water leakage and a method for preventing water leakage, more particularly to the leakage water cut-off agent that can penetrate into a water leaking crack or hole and fill the gap to prevent water from invading; and to the method for preventing water leakage by spreading the leakage water cut-off agent over or injecting the leakage water cut-off agent into the roof, floor or wall of a building.

BACKGROUND OF THE INVENTION

To prevent water leakage through a roof, a floor or a wall, the water leakage sites such as a hole, a crack and a gap must be coated or filled with a sealant. If the leakage sites cannot be specified, it requires a whole restoration such as re-roofing, replacing a waterproof sheet, complete spray coating or re-tiling the wall. Namely the simple maintenance such as coating or filling with the sealant is not sufficient enough, because of the difficulty in specifying the leakage sites.

No leakage guarantee term is often as long as 5 to 10 years. The constructor within the guarantee term, and the owner after the expiration of the term, is obliged to bear the costly expense for repairing.

The joint in a concrete construction is often water-proofed with asphalt or urethane. But, if the joint surface is dewy or wetted when it is applied thereto, the asphalt or urethane loses an adhesion property to the concrete and loses the capability to block water leakage as a waterproof joint. Therefore, the joint surface must be completely dried when the waterproof joint is applied. Incomplete dryness in a part of the joint surface would cause water leakage.

In this connection, Japanese Patent Application No.96672/1995 discloses rainwater leakage blocking agent for spreading, and a method for sealing a water-leaking crack with the water-insoluble powdery substance by spreading the said agent over a water-leaking sites. However, the problem is that the said agent or method is not efficient enough to seal a wide crevice or crack.

WO99/29798 discloses a penetrating water cut-off agent containing a gelable resin and a gellant as the main components, and a leakage water cut-off material manufactured by infiltrating the said agent in a spongy substance. The said penetrating water cut-off agent has an excellent waterproofing effect. However, further improvement has been desired because it often meets troubles in viscosity adjustment or gel storage stability.

The present invention is intended to find out a leakage water cut-off agent which has an excellent property to seal a water leakage site and can seal a wide crevice or crack by a simple process without damaging the appearance of a building.

DISCLOSURE OF INVENTION

The present inventors made a diligent study to solve the above problems and, as a result, have arrived at the present invention. The present invention relates to the followings.

(1) A leakage water cut-off agent comprising (a) a surfactant, (b) an aluminium compound, and (c) a basic substance.

(2) The leakage water cut-off agent according to the above item (1), wherein the component of (b) is an aluminium compound which reacts with the basic substance or reacts with water in the presence of the basic substance to form a gel.

(3) The leakage water cut-off agent comprising (a) a surfactant, (b) an aluminium compound, (c) a basic substance, and (d) water.

(4) The leakage water cut-off agent according to the above item (3), wherein (c) the said basic substance is an alkali metal hydroxide or an alkali earth metal hydroxide.

(5) The leakage water cut-off agent according to the above item (3), wherein the pH of the said leakage water cut-off agent is 8 or less.

(6) A method for preventing water leakage characterized by spreading the leakage water cut-off agent according to any one of the above items (1) to (5) followed by injecting water into a water invading hole.

(7) A method for preventing water leakage characterized by applying a combination or a reaction product of the four components of (a) a surfactant, (b) an aluminium compound, (c) a basic substance and (d) water to a water leakage site.

1: Concrete container

2: Seam

3: Wire

BEST MODE OF CARRYING OUT THE INVENTION

Figure 1:
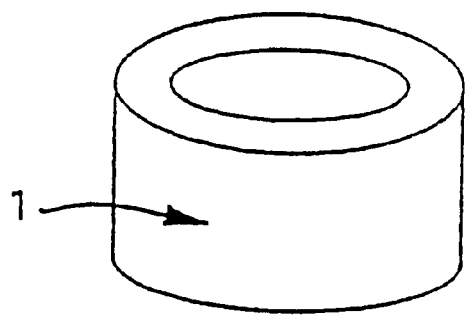
FIG. 1 shows one example of a concrete container.

The present invention will be described in detail below. The word "part" shows "part by mass", unless otherwise stated, in the following description.

The leakage water cut-off agent comprises (a) a surfactant, (b) an aluminium compound, and (c) a basic substance as the indispensable components. These components can be mixed, preferably in their powders, to give the leakage water cut-off agent.

The preferable leakage water cut-off agent contains (a) a surfactant, (b) an aluminium compound, (c) a basic substance and (d) water, and can be obtained by mixing these components in an optional order.

The surfactant (component (a)) to use in the leakage water cut-off agent of the present invention is considered to have a role to make the leakage water cut-off component easy to reach a water leakage site and simultaneously increase the leakage water cut-off effect by preventing water from invading into the site where once the said agent is applied. An anionic surfactant is preferable, including a sulfonic acid such as alkylbenzene sulfonic acid surfactant and an aliphatic acid surfactant, whose aliphatic hydrocarbon chain has a C number of, though not limited to as far as it is long enough to bring about the surface activity, 10–50, preferably 14–30. The aliphatic hydrocarbon residual may be saturated or unsaturated. Among these surfactants, an aliphatic acid alkali metal salt is preferable, because it reacts partially with the (b) component to form the aliphatic acid aluminium salt, which can furnish a gel containing aluminium hydroxide as a main component with water repellency. It includes the potassium or sodium of a saturated or unsaturated aliphatic acid having a carbon number of 14–30 such as stearic acid, oleic acid and palmitic acid.

The aluminium compound ((b) component) to use in the present invention is preferably a substance that can react with a basic substance or with water in the presence of the basic substance to form a gel containing aluminium hydroxide as a main component. A substance that can be mixed with an alkali metal hydroxide or an alkali-earth metal hydroxide to form a gel containing aluminium hydroxide as a main component is more preferable, including the aluminium salt of a strong acid such as sulfuric acid and nitric acid. An acid having a valency of 2 or more may be partially substituted with an alkali metal other than aluminium. The preferable substance includes an aluminium sulfate compound such as aluminium sulfate, aluminium ammonium sulfate, aluminium potassium sulfate, aluminium cesium sulfate, aluminium thallium sulfate, aluminium sodium sulfate, aluminium lithium sulfate and aluminium rubidium sulfate. The (c) component, that is, a basic substance such as an alkali metal hydroxide or an alkali-earth metal hydroxide changes partially the aluminium compound into a gel containing aluminium hydroxide as a main component, which can seal a water leakage site such as a hole, crack and gap. An alkali component contained in invading water in the crack changes the unchanged aluminium compound into a gel containing aluminium hydroxide as a main component, which also has a function to seal the said water leakage site.

The basic substance ((c) component) to use in the present invention is used to react with the (b) component to form an aluminium hydroxide-rich gel, and is preferably mixed so that the leakage water cut-off agent thus obtained may be pH 8.0 or less, more preferably 7–5.

The basic substance includes the hydroxide or the carbonate of an alkali metal or an alkali-earth metal. The alkali metal hydroxide includes potassium hydroxide, sodium hydroxide and lithium hydroxide. The alkali-earth metal hydroxide includes strontium hydroxide and calcium hydroxide. The alkali metal carbonate includes sodium carbonate and potassium carbonate. The alkali-earth metal carbonate includes calcium carbonate. The preferable basic substance is an alkali metal hydroxide or an alkali-earth metal hydroxide. A low hygroscopic basic compound is preferably used for preparing a water-free leakage water cut-off agent of the present invention.

The surfactant ((a) component), the aluminium compound ((b) component) and the basic substance ((c) component) have their respective mix rates relative to the sum of them as roughly estimated below although those rates cannot be defined generally as vary depending on a compound to mix with.

The surfactant ((a) component) has a mix rate of at least 4% or more, preferably 10% or more, more preferably 15% or more and 40% or less, preferably 30% or less.

The aluminium compound ((b) component) has a mix rate of at least 30% or more, preferably 40% or more, more preferably 50% or more and 95% or less, preferably 90% or less, more preferably 85% or less.

The basic substance ((c) component) has a mix rate of at least 1% or more, preferably 3% or more, and 30% or less, preferably 20% or less, more preferably 10% or less, and has finally such a rate that it may preferably adjust a solution of (a) component, (b) component and (c) component mixed with water to give pH 5–8, more preferably 5–7.

Therefore, the three components are preferably mixed at a mix ratio that a preliminary test determines, so that they may be mixed with water to produce a solution having pH within the above range.

The leakage water cut-off agent of the present invention comprises the surfactant ((a) component), the aluminium compound ((b) component) and the basic substance ((c) component) as the indispensable components, and preferably further comprises water ((d) component) in view of practical applicability.

Water in this case is generally added 0–30 times, preferably 1–15 times as much as the total amount (by mass) of the three components of (a)–(c).

If the agent further comprises water ((d) component), the three components have preferably their respective mix rates as described below relative to 100 parts of water.

The (a) component (surfactant) has generally a rate of 0.5–20 parts, preferably 1–10 parts.

The (b) component (aluminium compound) has generally a rate of 2–20 parts, preferably 3–10 parts.

The (c) component (basic substance) has generally a rate of 0.5–20 parts, preferably 1–15 parts, and has finally such a rate that it may preferably adjust a solution of (a) component, (b) component and (c) component mixed with water to give pH 5–8, more preferably 5–7.

The leakage water cut-off agent of the present invention can be obtained by mixing the above components at their respective rates uniformly. The components can be mixed in an optional order, but are preferably mixed by any one of the following two processes. Process 1: The basic substance ((c) component) is added to water ((d) component), and the aluminium compound ((b) component) is then added to dissolve under stirring followed by adding the surfactant ((a) component); and Process 2: The (c) component is added to the (d) component, and the (a) component is then added to dissolve under stirring followed by adding the (b) component.

A water-insoluble filler such as a water-insoluble powder, fiber or scale may be mixed in the leakage water cut-off agent of the present invention if necessary. An organic powdery substance, an inorganic powdery substance, an organic fibrous substance or an inorganic fibrous substance may be used for the water-insoluble substance of powder, fiber or scale to use as the water-insoluble filler. The powdery substance has preferably a wide and uniform diffusion in particle size of 0.001 $\mu$m–1 mm. The scale substance has preferably a diameter of about 0.1–2 mm.

The filler includes silica sol, silica powder, rosin powder, resin particle, clay, wood powder, cellulose powder, zeolite powder, pulp fiber, fibrous zinc oxide, vermiculite, pearlite and mica. These may be used alone or in combination of two or more. The two or more are preferably combined so that they may have a wide diffusion of particle size.

The water-insoluble filler is generally mixed in 5–30 parts, preferably 10–20 parts relative to 100 parts (by mass) of the total amount of the three components of (a)–(c).

If the agent further comprises water, the water-insoluble filler is generally mixed in 0.3–10 parts, relative to 100 parts of water ((d) component). The silica sol as the water-insoluble substance of powder is used in the above range of parts in terms of the solid. The water-insoluble filler is preferably added after finishing to mix the components of (a)–(d).

If the agent comprises no water (d), the powdery water-insoluble filler if necessary can be mixed with a mixture of the components of (a)–(c) or with the components of (a)–(c) to obtain the agent.

The leakage water cut-off agent of the present invention is spread around a water-invading hole followed by injecting water into the hole if the hole can be specified in position. If a water leakage site is not clear, the agent may be spread all over the roof, floor or wall uniformly. It is not necessary to coat all over the roof, floor or wall.

The leakage water cut-off agent of the present invention is preferably applied to a reinforced concrete flat roof. The roof is generally prepared with a combination of concrete joint waterproofing and membrane waterproofing such as asphalt waterproofing, sheet waterproofing and coated membrane waterproofing. Therefore, the agent may be spread over the waterproofing layer.

The leakage water cut-off agent of the present invention is preferably applied to a concrete exposed floor. Even if the floor is covered with mortar, a coating material or a sheet, the agent may be spread over it.

The leakage water cut-off agent of the present invention is preferably applied to a wall that is prepared with cement mortar, sprayed acryl lysine, tile, brick, concrete or the like.

EXAMPLE

The present invention will be described in details with reference to examples.

Example 1

| (1) Aluminium sulfate | 70 g |
| (2) Sodium stearate | 20 g |
| (3) Sodium hydroxide (28% aqueous solution) | 30 g |
| (4) Water | 1,000 g |

The aqueous sodium hydroxide solution (3) was added in water (4) under stirring, and the aluminium sulfate (1) was then added to dissolve under stirring followed by adding the sodium stearate (2) in the solution under further stirring to obtain the leakage water cut-off agent of the present invention.

600 g of water was added in 2.6 Kg of the commercially-available sand-mixed cement (Trade name: Katei Cement, made by Tokyo Sun Home KK) to mix thoroughly, followed by packing in a framework to solidify into the shape as shown in FIG. 1.

Figure 2:
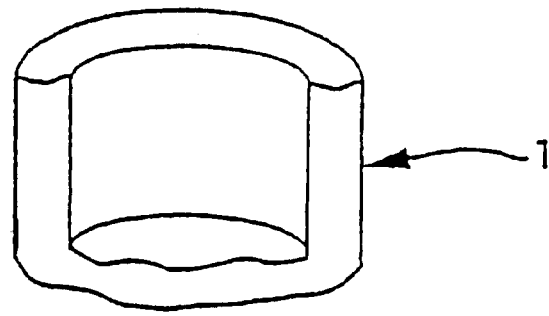
FIG. 2 shows one of the bisecting pieces of the concrete container of FIG. 1.
Figure 3:
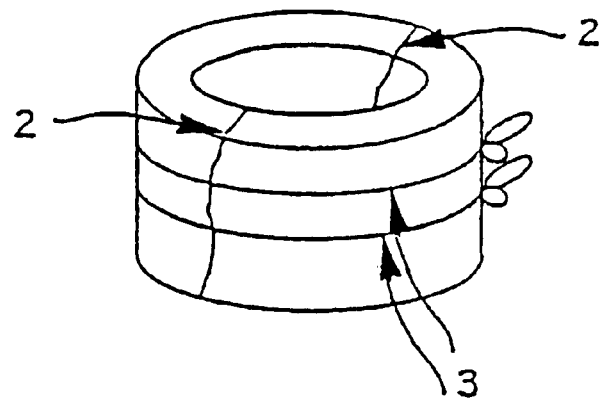
FIG. 3 shows a water leakage test container in which the two bisecting pieces of the concrete container of FIG. 1 are fixed with a wire.

This concrete container was bisected (as in FIG. 2), and the two pieces were then unified again with a 1 mm thick, 5 mm wide polyester film of spacer placed between them and reinforced with wire as in FIG. 3. This container was filled with water, but immediately leaked water through the joint. 30 g of the above leakage water cut-off agent of the present invention was poured in the joint of the container. The container was left for 3 hours, was filled with water and it leaked no water through the joint. The container filled with water was left for 3 days and it leaked no water through the joint.

The container treated with the above leakage water cut-off agent of the present invention was emptied of water and dried at 60° C. for 3 days. The container was filled with water again, and it leaked no water through the joint.

Example 2

| (1) Aluminium ammonium sulfate | 80 g |
| (2) Sodium oleate | 20 g |
| (3) Sodium hydroxide (28% aqueous solution) | 20 g |
| (4) Water | 1,000 g |

The aqueous sodium hydroxide solution (3) was added in water (4) under stirring, and the aluminium ammonium sulfate (1) was then added to dissolve under stirring followed by adding the sodium oleate (2) in the solution under further stirring to obtain the leakage water cut-off agent of the present invention.

The same container as in Example 1 was prepared separately. 50 g of the above leakage water cut-off agent of the present invention was poured in the joint of the container. The container was left for 3 hours, was filled with water and it leaked no water through the joint. The container filled with water was left for 3 days and it leaked no water through the joint.

The container treated with the above leakage water cut-off agent of the present invention was emptied of water and dried at 60° C. for 3 days. The container was filled with water again, and it leaked no water through the joint.

Example 3

| (1) Aluminium sulfate | 33 g |
| (2) Half-hardened soda soap of a cattle fatty acid | 14 g |
| (3) Cellulose powder | 10 g |
| (4) Zeolite powder | 8 g |
| (5) Lithium hydroxide 1 hydrate | 21 g |
| (6) Water | 1,000 g |

The lithium hydroxide 1 hydrate (5) was added in water (6) under stirring, and the half-hardened soda soap of a cattle fatty acid (2), the cellulose powder (3) and the zeolite powder (4) were then added to disperse under stirring followed by adding the aluminium sulfate (1) in the solution under stirring to obtain the leakage water cut-off agent of the present invention.

The same container as in Example 1 was prepared separately. 50 g of the above leakage water cut-off agent of the present invention was poured in the joint of the container. The container was left for 3 hours, was filled with water and it leaked no water through the joint. The container filled with water was left for 3 days and it leaked no water through the joint.

The container treated with the above leakage water cut-off agent of the present invention was emptied of water and dried at 60° C. for 3 days. The container was filled with water again, and it leaked no water through the joint.

INDUSTRIAL APPLICABILITY

A leakage water cut-off agent of the present invention, if applied to the crack of a mortar or concrete product, can fill the crack quickly to prevent water from invading inside. Therefore, the present invention is useful for preventing the mortar or concrete product from deteriorating.

What is claimed is:
1. A leakage water cut-off agent comprising (a) a surfactant, (b) an aluminium compound, and (c) a basic substance.

2. The leakage water cut-off agent according to claim 1, wherein the component of (b) is an aluminium compound which reacts with the basic substance or reacts with water in the presence of the basic substance to form a gel.

3. The leakage water cut-off agent comprising (a) a surfactant, (b) an aluminium compound, (c) a basic substance, and (d) water.

4. The leakage water cut-off agent according to claim 3, wherein (c) the said basic substance is an alkali metal hydroxide or an alkali earth metal hydroxide.

5. The leakage water cut-off agent according to claim 3, wherein pH of the said leakage water cut-off agent is 8 or less.

6. A method for preventing water leakage characterized by spreading the leakage water cut-off agent according to any one of claims 1 to 5 followed by injecting water into a water invading hole.

7. A Method for preventing water leakage characterized by applying a combination or a reaction product of the four components of (a) a surfactant, (b) an aluminium compound, (c) a basic substance and (d) water to a water leakage site.

* * * * *